United States Patent
Bentrim et al.

(10) Patent No.: US 8,161,616 B2
(45) Date of Patent: Apr. 24, 2012

(54) METHOD OF MANUFACTURE FOR A PLASTIC-CAPPED PANEL FASTENER

(75) Inventors: Brian G. Bentrim, Furlong, PA (US); David Bruno, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 30 days.

(21) Appl. No.: 12/888,624

(22) Filed: Sep. 23, 2010

(65) Prior Publication Data

US 2011/0072630 A1 Mar. 31, 2011

Related U.S. Application Data

(60) Provisional application No. 61/245,901, filed on Sep. 25, 2009.

(51) Int. Cl.
  *B21D 39/00* (2006.01)
(52) U.S. Cl. ...... 29/447; 29/509; 29/525.02; 29/525.11; 29/527.1; 411/999
(58) Field of Classification Search .............. 29/447, 29/509, 525.02, 525.11, 527.1; 411/999
  See application file for complete search history.

(56) References Cited

U.S. PATENT DOCUMENTS

| | | | |
|---|---|---|---|
| 4,952,107 A | 8/1990 | Dupree | |
| 5,017,068 A | 5/1991 | Cooksey | |
| 5,020,951 A | 6/1991 | Smith | |
| 5,094,579 A | 3/1992 | Johnson | |
| 5,462,395 A | 10/1995 | Damm et al. | |
| 5,544,992 A | 8/1996 | Ciobanu | |
| 5,642,972 A | 7/1997 | Ellis et al. | |
| 5,738,477 A | 4/1998 | McCorkle et al. | |
| 5,741,101 A | 4/1998 | Gulistan | |
| 5,743,692 A | 4/1998 | Schwarz | |
| 5,851,095 A | 12/1998 | Ellis et al. | |
| 6,079,923 A | 6/2000 | Ross et al. | |
| 6,394,724 B1 | 5/2002 | Kelly et al. | |
| 6,468,012 B2 * | 10/2002 | Ellis et al. | 411/353 |
| 6,814,530 B2 | 11/2004 | Franco et al. | |
| 7,083,371 B2 * | 8/2006 | McAfee | 411/107 |
| 7,237,333 B2 * | 7/2007 | McAfee | 29/843 |
| 7,278,809 B2 * | 10/2007 | Aukzemas et al. | 411/432 |

* cited by examiner

*Primary Examiner* — Jermie Cozart
(74) *Attorney, Agent, or Firm* — Gregory J. Gore

(57) ABSTRACT

A captive panel fastener is manufactured by first overmolding a plastic cap around the head of a screw, the cap having a cylindrical plastic skirt extending downwardly beyond the base of the screw head and formed with a circular opening at the bottom. After a compression spring is placed around the shank of the screw, the screw is pressed against a top surface of a ferrule to a point where the capped-skirt extends downwardly below a ferrule flange. At that point, heat and pressure are applied radially inwardly around the periphery of the plastic skirt along its bottom edge until it is permanently deformed to a point where the bottom of the skirt is smaller in diameter than the ferrule flange. The screw is thereby captivated to the ferrule between extended and retracted positions.

7 Claims, 2 Drawing Sheets

METHOD OF MANUFACTURE FOR A PLASTIC-CAPPED PANEL FASTENER

RELATED APPLICATION

This patent application is related to provisional patent application Ser. No. 61/245,901 entitled "Plastic-Capped Panel Fastener" filed on Sep. 25, 2009, priority from which is hereby claimed.

FIELD OF THE INVENTION

The present invention relates to captive panel fasteners used to attach one panel to another face-to-face. The screw is captive within an assembly that is permanently attached to one panel while permitting the screw to be extended beyond the first panel to become threadably engaged with the second panel by turning the screw.

BACKGROUND OF THE INVENTION

In general, captive panel fasteners comprise three main components, a screw, a cap and a ferrule. The screw is first attached to the cap and then the screw and cap are assembled to the ferrule. All parts are typically composed of metal with the cap being formed from relatively thin-walled aluminum that is easily deformable. The headed screw includes a threaded elongate shank that extends downward through a bore in the ferrule beyond its base. The base of the ferrule includes attachment means for securing the ferrule to a panel. The screw is slidable within the ferrule between retracted and extended positions. The screw is fitted with a surrounding cap that extends downwardly around the screw and at least a top portion of the ferrule. The top of the ferrule includes securing means to prevent the screw/cap assembly from being pulled upwardly out of the ferrule. One means of attachment is a radially extending flange at the top of the ferrule which abuts an inwardly extending ring at the bottom of the cap. The top of the ring and the bottom of the ferrule flange abut when the screw is in the fully retracted position. The ring at the bottom of the cap is preferably integrally formed with the cap when assembled to the ferrule by bending over the metal bottom edge of the cap inwardly once the cap and the screw have been placed onto the ferrule.

A problem exists with the prior art in that the cap must be machined at a high cost due to the amount of material that must be removed as scrap. Once formed, the cap must then be assembled to the screw as one of the steps in the assembly process. If one wishes to add color to the cap, color can be applied through anodizing or painting but wear of the part can cause chipping of the color leaving a product with a shabby appearance.

SUMMARY OF THE INVENTION

In order to improve upon the prior art captive panel fasteners described above, the present plastic-capped panel fastener has been devised. According to the invention, the cap is composed of a plastic that is overmolded onto the screw. This provides numerous benefits. First, the production process offers no waste as the cap comes out complete. Any excess material used in the molding process can be reused. Because the cap is all overmolded onto the screw, the step of mounting the cap to the screw in the assembly process is obviated. Thus, the entire formation and assembly process is notably less expensive than the machining and mounting process required for an aluminum cap. Furthermore, coloration can be accomplished by coloring the plastic compound prior to molding, which leaves a durably colored cap with excellent wear properties that avoids the prior art wear problems with attempting to color an aluminum cap.

One of the unique features of the present invention is the means by which the cap is slidably secured to the ferrule. The prior art rollover technique of bending the bottom edge of the aluminum cap to form an inwardly extending ring cannot be directly applied to a plastic cap because plastic does not bend into new shapes readily. However, it has been discovered that with the addition of heat to the rollover concept used for aluminum, that a ring at the base of the plastic cap can be successfully formed. The application of heat allows the plastic to flow with a mild application of force. After the new shape is achieved, the plastic cools and permanently hardens into the new desired shape.

More specifically, the Applicants have invented a method of manufacturing a captive panel fastener beginning with over-molding a plastic cap around the head of a screw having a shank, the cap having a cylindrical plastic skirt extending downwardly beyond a base of the screw head formed with a circular opening at the bottom. Then, a compression spring is placed around the shank of the screw before it is inserted into the throughbore of a ferrule having a radially extending flange at the top end and panel attachment means at the bottom end. The screw is then pressed against a top surface of the ferrule to a point where the cap skirt extends downwardly below the ferrule flange. At that point, heat and pressure are applied radially inwardly around the periphery of the plastic skirt along its bottom edge until it is permanently deformed to a point where the opening at the bottom of the skirt is reduced to a radiused ring of lesser diameter than the diameter of the ferrule flange. The heat and pressure are preferably applied by rolling contact against a heated forming surface. This axially captivates the screw to the ferrule between retracted and extended positions of the screw.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

Figure 1:
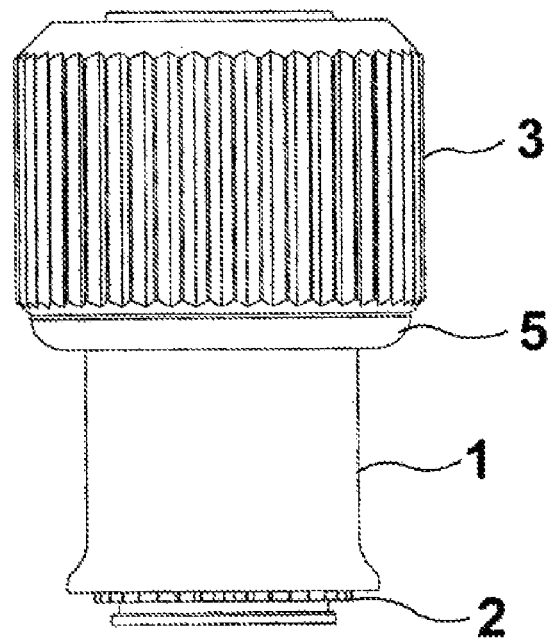
FIG. 1 is a front elevation view of the panel fastener of the invention.

Referring now to FIG. 1, the captive panel fastener of the present invention is shown. Basic elements of this fastener include cap 3 which is rotatably and slidably secured to ferrule 1. The ferrule 1 includes panel attachment means 2 which secure the ferrule 1 to a first panel. As further described herein, a lower edge of the cap 5 is molded according to the present invention in order to complete the assembly of parts.

Figure 2:
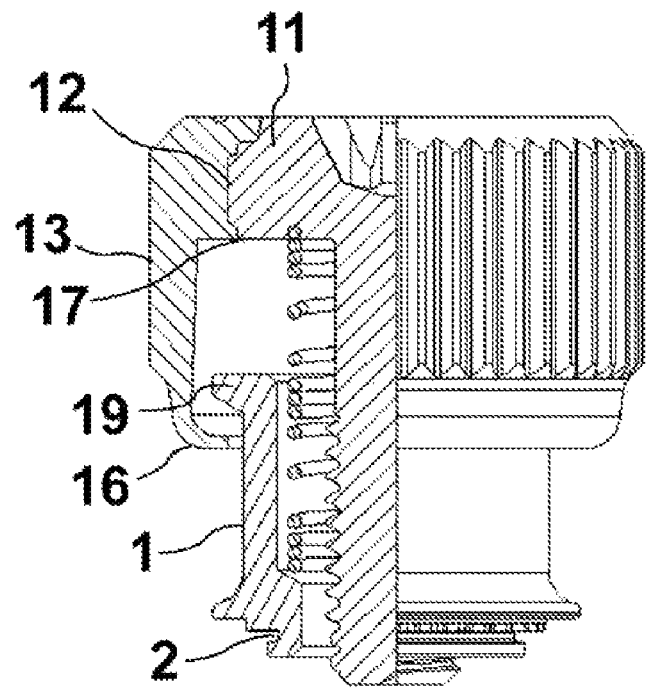
FIG. 2 is a front elevational partial section view.

Referring now to FIG. 2, the screw 11 of the captive panel fastener of the invention includes knurled indentations 12 along its side surface to receive the molten plastic for added torque resistance. The molded plastic cap 13 is kept from the bottom of the screw 17 so that upon full extension, that head of the screw 11 directly contacts the top of the ferrule 1 for more direct force transferral between the screw 11 and the ferrule 1. This is beneficial when the attachment means at the base of the ferrule 1 require the application of a relatively high force to the top of the screw. Such an attachment means may be for example, clinch attachment structures 2 which receive the cold flow of metal from the panel when a pressing force is applied. Inwardly directed ring 16 interferes with radially outward flange 19 at the top of the ferrule 1 to axially retain the cap to the ferrule.

Figure 3:
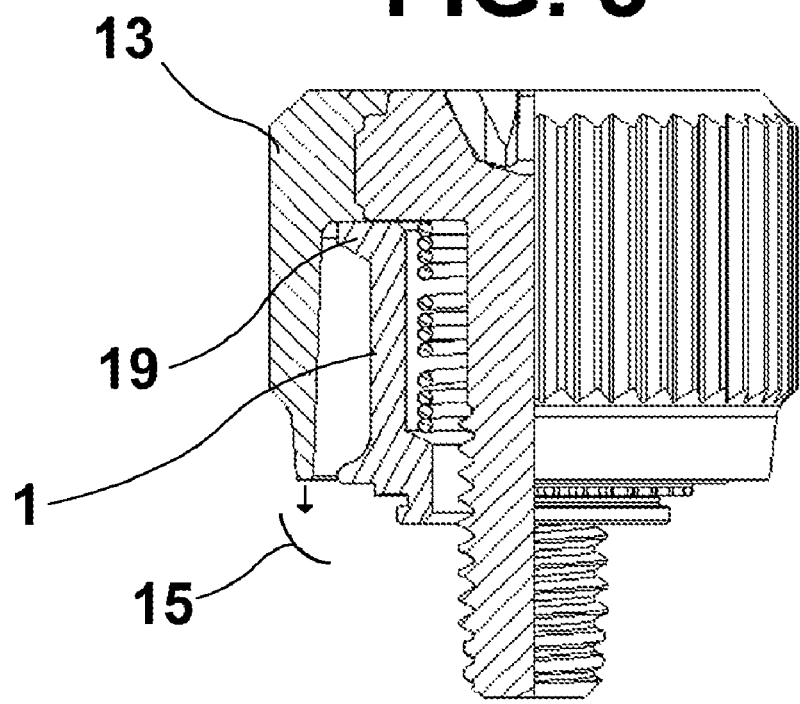
FIGS. 3 and 4 are front elevation partial section view showing the molding process of the cap along its bottom edge.
Figure 4:
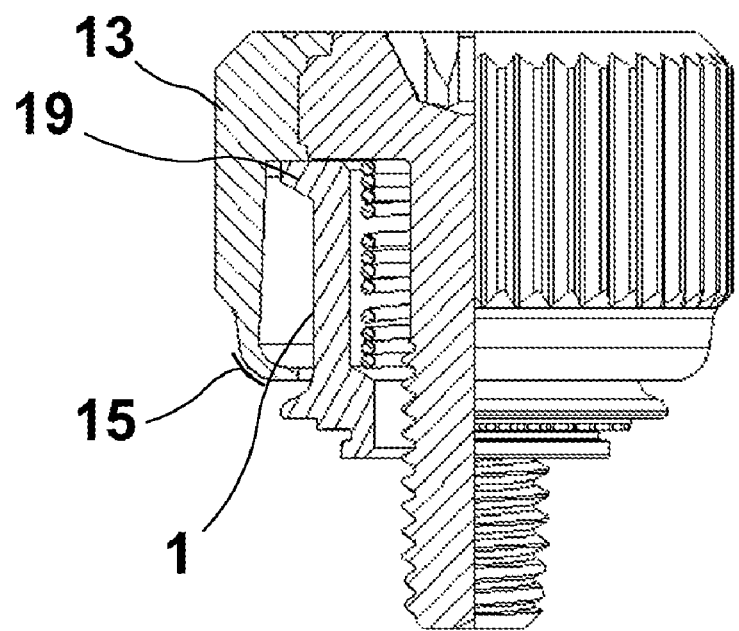

FIGS. 3 and 4 show the before and after application of the present method for forming the cap of a captive panel fastener which includes the application of heat to rolling pressure against a straight skirted molded plastic cap 13 in order to form an inwardly directed ring at the base of the cap. As seen from these figures, axial force is applied and shown in FIG. 3 to move the fastener downward against forming surface 15 which is heated to melt the bottom edge of the plastic cap into the resultant form shown in FIG. 4 through the application of heat and pressure. Once formed, the ring abuts with a radially outwardly directed flange 19 at the top of the ferrule 1 to prevent the cap 13 and ferrule 1 from being pulled apart while maintaining the rotatable and slidable engagement of the parts.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is:

1. A method of manufacturing a captive panel fastener comprising the steps of:
    providing a plastic-capped screw having a screw head, a shank and a cylindrical plastic skirt of the cap extending downwardly beyond a base of the screw head, said skirt having a circular opening at the bottom;
    placing a compression spring around the shank of said screw;
    inserting said capped screw into a throughbore of a ferrule having a radially extending flange at a top end and panel attachment means at a bottom end thereof;
    pressing the base of said screw head against a top surface of said ferrule where said skirt extends downwardly below said ferrule flange; and
    applying heat and pressure radially inwardly around a periphery of said plastic skirt along a bottom edge thereof such that said bottom edge is permanently deformed to a point where the opening at the bottom of said skirt is reduced to a radiused ring of lesser diameter than the outer diameter of said ferrule flange thereby axially captivating said screw to said ferrule between retracted and extended positions of the screw.

2. The method of claim 1 wherein said plastic cap is formed around said screw head by over-molding.

3. The method of claim 2 wherein said pressure is applied by rolling contact against a heated forming surface.

4. The method of claim 3 wherein said screw is composed of metal.

5. The method of claim 4 wherein said shank is elongate and threaded.

6. A method of manufacturing a captive panel fastener comprising the steps of:
    over-molding a plastic cap around the head of a screw having a shank, the cap having a cylindrical plastic skirt extending downwardly beyond a base of the screw head, said skirt having a circular opening at the bottom;
    placing a compression spring around the shank of said screw;
    inserting said capped screw into a throughbore of a ferrule having a radially extending flange at a top end and panel attachment means at a bottom end thereof;
    pressing the base of said screw head against a top surface of said ferrule where said skirt extends downwardly below said ferrule flange; and
    applying heat and pressure radially inwardly around a periphery of said plastic skirt along a bottom edge thereof such that said bottom edge is permanently deformed to a point where the opening at the bottom of said skirt is reduced to a radiused ring of lesser diameter than the outer diameter of said ferrule flange thereby axially captivating said screw to said ferrule between retracted and extended positions of the screw.

7. The method of claim 6 further described in that said skirt has a circular opening at its bottom end.

\* \* \* \* \*